United States Patent Office 3,689,284
Patented Sept. 5, 1972

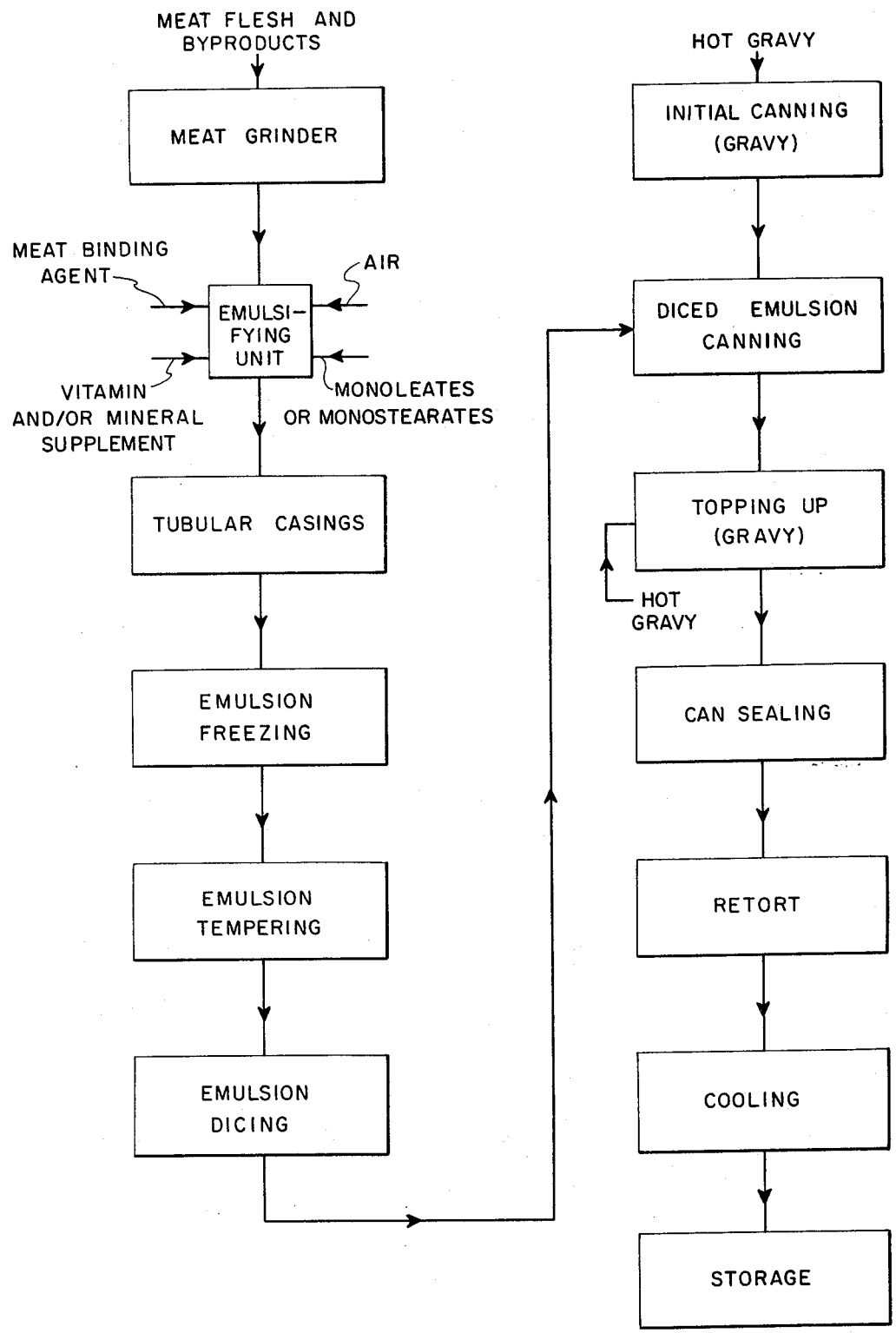

3,689,284
PROCESS OF PRODUCING A FOOD PRODUCT
William Nash, Trenton, Ontario, Canada (R.R. 3, Belleville, Ontario, Canada), and Walter E. Ward, R.R. 2, Peterborough, Ontario, Canada
Continuation-in-part of application Ser. No. 821,309, May 2, 1969. This application Dec. 23, 1971, Ser. No. 211,480
Int. Cl. A22c 18/00; A23b 1/00; A23k 1/00
U.S. Cl. 99—107        1 Claim

ABSTRACT OF THE DISCLOSURE

A process for producing a food product is defined. The food product may be for either human or animal consumption. The process has the steps: (a) comminuting meat to form an emulsion having a proper consistency; (b) lowering the temperature to achieve the frozen or semi-frozen state; (c) dicing the emulsion; (d) covering the frozen or semi-frozen emulsion with an edible liquid at a temperature sufficient to heat set the protein in the outer surface of the diced portion; and (e) subsequently cooking the diced portions. Preferred embodiments include special temperature ranges, moisture levels, size of the diced portions, inclusion of an edible gas, inclusion of a meat binder, and placing the emulsion in a hermetically sealed container immediately prior to cooking.

CROSS REFERENCE TO RELATED APPLICATIONS

This application is a continuation-in-part of application Ser. No. 821,309 filed May 2, 1969 now abandoned.

BACKGROUND OF THE INVENTION

Field of the invention

This invention is concerned with a process of producing a food product which may be a pet food or a food product intended for human consumption. More specifically, the invention relates to the production of a meat product in which the meat is in the form of discrete cooked dices in an edible liquid, or gravy, environment. The term "meat" as herein used includes fish and fowl, such as poultry, as well as the meat of mammals.

Description of the prior art

In the pet food trade, and also in the trade relating to the production of food products for human consumption, it has in the past been the practice, with the view to reducing the cost of production of meat food products of the type referred to above, to include with the meat flesh a proportion of meat by-products, such as the gullet, heart, and intestines of mammals or fowl or, for example, the head, intestines and bones of fish, or even, particularly in the case of pet foods, to use meat by-products exclusively. The term "meat" as herein used includes both meat flesh and meat by-products, as well as mixtures thereof.

As will be appreciated the use of meat by-products, whether alone or together with meat flesh, necessitates fine comminution of the by-products in order to destroy the identity thereof.

While various processes have hitherto been proposed for the production, using meat by-products, of meat products of the type referred to it is a disadvantage of the products produced by a number of these processes that the dices of meat tend to disintegrate in the gravy environment.

SUMMARY OF THE INVENTION

It is an object of the present invention to provide a process of producing a meat food product of the type referred to wherein the diced meat substantially retains its form as discrete integral lumps in the gravy environment, such a product being in many respects more acceptable to the consumer than a meat food product in which the meat is in the form of a single relatively large block of compressed ground meat or in which the product has the consistency of a pulp.

The object of the invention is accomplished by a process comprising the steps:

(A) finely comminuting uncooked meat to form an emulsion while introducing air or an inert gas therein in an amount up to 50 percent by volume, said emulsion having protein material throughout, including its outer surfaces, said emulsion containing from 65 percent to 85 percent by weight water based on the total weight of the emulsion, and said emulsion having the fat portion of the uncooked meat reduced in particle size until it is less than $\frac{1}{16}$-inch and substantially having the fat portion of the uncooked meat thoroughly smeared over the remaining portion of the meat;

(B) lowering the temperature of the emulsion by rapidly cooling the emulsion to a temperature of from −10° F. to 0° F. whereby the emulsion is in a frozen or semi-frozen state;

(C) tempering the frozen or semi-frozen emulsion to a temperature of from 28° F. to 35° F. for a time period of from about 1 hour to about 24 hours;

(D) dicing the frozen or semi-frozen emulsion;

(E) covering the diced, frozen or semi-frozen emulsion with an edible liquid having a temperature of at least 190° F. to heat set the protein material in the outer surfaces of the diced emulsion to form a skin around the emulsion dices and thereby prevent disintegration and agglomeration of said emulsion dices; and (F) cooking the diced emulsion and edible liquid after the protein material in the outer surface has been heat set by the edible liquid.

In a process according to the invention meat is finely comminuted to form an emulsion having substantially the consistency of a pulp. The temperature of the emulsion is then lowered to render the emulsion in a frozen or semi-frozen state, and the frozen or semi-frozen emulsion is diced. Finally, the diced, frozen or semi-frozen emulsion is covered with an edible liquid having a temperature of at least 190° F. thereby to heat set the protein material in the outer surfaces of the emulsion dices, and the diced emulsion is cooked.

With reference to the drawing, which is hereinafter more fully described, uncooked meat at a temperature which is preferably within the range 30° F. to 40° F. but which may be substantially lower is ground in a meat grinder which may be of conventional form and operation.

The meat, the nutritional properties of which are retained to a high degree by processes according to the invention, comprises both meat flesh and meat by-products although it is to be understood that in alternative embodiments of the invention the meat may consist entirely of meat flesh or entirely of meat by-products. Where the meat consists entirely of meat flesh, in which case the meat product will generally be intended for human consumption, the process according to the invention serves to tenderize the resultant meat product. This may be of importance in, for example, the case of baby foods.

By, if necessary, adding water to the meat, although this is not in general required, it is preferably arranged that the ground meat contains a major portion, say between 65 percent and 80 percent by weight of water.

The ground meat together with a meat binding agent such as a cereal binder, for example milk powder or wheat flour, is passed through an emulsifying unit which consists essentially of a high speed rotary cutting disc and which may be of conventional form. Sodium nitrite and artificial flavourings, if desired, are also passed through the emulsifying unit with the ground meat. In addition, a vitamin and/or mineral supplement may be added to the ground meat in the emulsifying unit. Air or an inert gas, such as nitrogen, may be introduced into the mixture in the emulsifying unit and an emulsifying agent or agents, such as a monoleate or monostearate, may also be introduced in the mixture thereby to thicken the finely comminuted meat emulsion which is produced and thus enable the emulsion to contain a larger amount of air or inert gas. The purpose of so introducing air or an inert gas is to improve the tenderness, palatability and the digestibility of the resultant food product. Where air or an inert gas is introduced as described above the emulsion may have an over-run of, say, up to 100 percent, which means that in the emulsion 50 percent of the bulk thereof is constituted by air or inert gas.

The emulsion, which has substantially the consistency of a homogeneous pulp, is then pumped into elongated tubular casings formed of high slip polyethylene. The temperature of the emulsion within the casings is thereafter lowered to render the emulsion in a frozen or semi-frozen state, this preferably, although not necessarily, being achieved by freezing the emulsion, for example, by cooling the emulsion to a temperature within the range —10° F. to 0° F. by a quick freezing process which may be conventional in character, and then tempering the frozen emulsion within the casings to a temperature within the range 25° F. to 35° F. for a time period of from about 1 hour to about 24 hours and preferably within the range 28° F. to 35° F. at which stage the emulsion is in a frozen or semi-frozen state. The above described step of freezing the emulsion to, for example, a temperature within the range —10° F. to 0° F. serves, because of the rapid lowering of the temperature of the emulsion, to inhibit bacterial growth in the emulsion, the subsequent tempering of the frozen emulsion serving to reduce the hardness of the emulsion thereby to facilitate dicing of the emulsion. As will be understood, the emulsion when in the frozen condition at a temperature of, for example within the range —10° F. to 0° F. may be stockpiled for indefinite periods to meet future production requirements.

The meat emulsion is considered to be semi-frozen when in such a state that although frozen and sufficiently stiff that, when diced, the lumps of emulsion substantially retain their form it nevertheless has a degree of softness.

The frozen or semi-frozen emulsion is diced after being removed from the tubular casings, the emulsion dices preferably each being of substantially cubical form having length, breadth and height dimensions within the range ⅛ inch to ¾ inch, and preferably of the order of ¼ inch, although it is to be understood that the scope of the invention is not restricted to embodiments in which the emulsion dices are of cubical form but includes embodiments in which the emulsion is cut or chopped into lumps of substantially any shape.

They diced, frozen or semi-frozen emulsion may be placed in a container such as a can or glass container, with a hot edible liquid or gravy, which is preferably constituted by a gravy containing a major proportion of water together with a thickening agent, such as flour, seasoning, and, if desired, artificial or natural colouring, the diced emulsion being covered with the gravy. Preferably, the canning or packing operation, which may be of the conventional character for products of the type in question, comprises the steps of partially filling each container with the hot gravy, introducing the appropriate quantity of the diced, frozen or semi-frozen emulsion into the container, and topping up the container with a further quantity of the hot gravy.

The hot gravy, which is at a temperature of at least 190° F. and preferably at a temperature within the range 190° F. to 212° F. causes heat setting of the protein material in the outer surfaces of the emulsion dices thereby to form a skin around the dices which substantially prevents disintegration and agglomeration of the dices. The containers are then hermetically sealed and the sealed containers are heated, by for example being passed through a retort, to cause cooking of the emulsion dices and sterilization of the diced emulsion and gravy within the containers. The heating of sealed containers in a retort for these purposes is well known in the art and the time and temperature factors to ensure proper cooking and commercial sterilization may readily be determined by standard test procedures.

Finally, the hermetically sealed containers are cooled and are then stored in the normal manner. The food product may be used in the cold condition or after being heated, either by heating the unopened containers and then opening the containers and removing the contents for consumption or by opening and emptying the containers into, for example, a saucepan or the like in which the food product is then heated. In the resultant heated meat food product which the consumer uses the diced meat emulsion is substantially in the form of discrete, integral lumps, such a meat food product being much more acceptable to the consumer than products in which the emulsion dices have distintegrated. For example, a meat food product can be much more readily assimilated by cats if the meat is substantially in the form of discrete, integral lumps. Likewise, in relation to meat food products for human consumption the consumer generally prefers the meat to be in the form of discrete, integral lumps which are free from striated muscle or connective tissue and which can therefore be more rapidly digested, the starches being so digested first.

In summary, our invention may be described as a process comprising the steps:

(A) finely comminuting uncooked meat to form an emulsion while introducing air or an inert gas therein in an amount up to 50 percent by volume, said emulsion having protein material throughout, including its outer surfaces, said emulsion containing from 65 percent to 85 percent by weight water based on the total weight of the emulsion, and said emulsion having the fat portion of the uncooked meat reduced in particle size until it is less than ⅟₁₆-inch and substantially having the fat portion of the uncooked meat thoroughly smeared over the remaining portion of the meat;

(B) lowering the temperature of the emulsion by rapidly cooling the emulsion to a tempearture of from —10° F. to 0° F. whereby the emulsion is in a frozen or semi-frozen state;

(C) tempering the frozen or semi-frozen emulsion to a temperature of from 28° F. to 35° F. for a time period of from about 1 hour to about 24 hours;

(D) dicing the frozen or semi-frozen emulsion;

(E) covering the diced, frozen or semi-frozen emulsion with an edible liquid having a temperature of at least 190° F. to heat set the protein material in the outer surfaces of the diced emulsion to form a skin around the emulsion dices and thereby prevent disintegration and agglomeration of said emulsion dices; and
(F) cooking the diced emulsion and edible liquid after the protein material in the outer surface has been heat set by the edible liquid.

It is preferred that the frozen or semi-frozen emulsion is maintained at a temperature of from 25° F. to 35° F. during the dicing step. It may also be preferred to place the emulsion in a hermetically sealed container immediately prior to cooking and then cooking to sterilize the diced emulsion and edible liquid in the container. It is also preferred to temper the emulsion after it is frozen with said tempering occurring at a temperature of from 28° F. to 35° F. It may also be preferred to freeze the emulsion by rapidly cooling it to a temperature of from —10° F. to 0° F. Further preferred embodiments include control of the emulsion to insure that it includes a major portion by weight of water and preferably from 65 percent to 85 percent by weight water. Still other embodiments include those in which the meat is uncooked prior to comminution and one in which the emulsion dices are each substantially cubical in form and having a length, breadth, and height dimension of from 1/8 inch to 3/4 inch.

Further alternate embodiments of our process include those wherein part of the meat comprises meat by-products, those wherein the emulsion contains at least one emulsifying agent, and those in which the emulsification step includes the addition of air or an inert gas. Still further alternative embodiments include those in which the meat is at a temperature of from 30° F. to 40° F. during the grinding thereof and those in which the emulsion includes a meat binding agent and preferably a cereal binder.

BRIEF DESCRIPTION OF THE DRAWING

In order that the invention may be more clearly understood and more readily carried into effect the same will now, by way of example, be described more fully with reference to the accompanying drawing which is a flow diagram of a process according to a preferred embodiment of the invention.

As is illustrated in the accompanying drawing, meat flesh and by-products are passed to a meat grinder where they are ground. The ground meat and meat by-products are then passed to an emulsifying unit where they are emulsified along with added meat binding agent, air, monoleates or monostearates, and vitmains and/or mineral supplements. This emulsification is then passed into tubular casings an then immediately to an emulsion freezing step where it is cooled preferably to from —10° F. to 0° F. whereby the emulsion is in a frozen or semi-frozen state. This frozen emulsion is then passed to the emulsion tempering step wherein it is tempered preferably at from 25° F. to 35° F. The tempered emulsion is then diced in the emulsion dicing step. The diced emulsion then goes to the diced emulsion canning step wherein it is added to hot gravy which has been through an initial canning (gravy) process. Additional hot gravy is then added to the product in the topping up (gravy) step and the hot gravy that has thus been added heat sets the protein material in the outer portion of the emulsion. This product then goes through the steps of can sealing, retort, and cooling and is then ready for storage as a new and unique product.

DESCRIPTION OF THE PREFERRED EMBODIMENT

A preferred embodiment of our invention may be illustrated by the following example.

EXAMPLE

A food product produced by a process according to the present invention may be constituted as follows, the percentages quoted all being percentages by weight:

|  | Percent |
| --- | --- |
| Meat (including by-products thereof) | 45.0 |
| Meat binding agent | 4.5 |
| Vitamin and mineral supplement | 0.5 |
| Gravy: |  |
|   Water | 47.0 |
|   Thickening agent | 2.0 |
|   Seasoning | 1.0 |
|  | 100.0 |

The meat (uncooked) while preferably within the temperature range of from 30° F. to 40° F. is ground in a meat grinder which may be of conventional form and operation. The meat is then preferably arranged to have a major portion thereof comprising water, and preferably between 65 percent and 80 percent by weight water based on the total weight of the mixture. The meat binding agent such as cereal binder, for example wheat flour, is then added along with the vitamin and mineral supplement. The mixture is then passed to an emulsifying unit where it is emulsified. At this point, it is preferred to add air or inert gas to the emulsion causing the emulsion to have an over-run of say, up to 100 percent.

The above defined emulsion, having substantially the consistency of a pulp, is then pumped into elongated tubular casings formed of high slip polyethylene wherein it is rapidly cooled to a temperature range of from —10° F. to 0° F. whereby the emulsion is in a frozen or semi-frozen state. At this point, the frozen or semi-frozen emulsion is heated to a temperature of about 25° F. to 35° F. and tempered at that temperature. The emulsion, being at this point frozen or semi-frozen, is then removed from the casing and diced into dices having a substantially cubical form and having length, breadth, and height dimensions within the range of 1/8 inch to 3/4 inch. The diced emulsion is then placed into a container such as a can or glass jar. The gravy portion is then heated to a temperature of from 190° F. to 212° F. and poured onto the emulsion to heat set the protein material in the outer portion of the emulsion. The container is then hermetically sealed and heated, by, for example, being passed through a retort, to cause cooking of the emulsion dices and sterilization of the diced emulsion and gravy, within the cans or glass containers. This heating step may be any one of those well known to the art. Finally the containers are cooled and stored.

The above described process produces a product which when taken from the container and heated yields a highly acceptable diced meat emulsion which is substantially in the form of discrete, integral lumps. While the example explains a preferred embodiment of our invention, we do not intend it to limit our invention to it since our invention includes also the various alternative embodiments hereinbefore more fully described.

It may thus be seen that we have discovered a new and unique process for producing a food product. Therefore, we claim:

1. A process for producing a food product, said process comprising the steps:
 (A) finely comminuting uncooked meat having a temperature within the range of 30° F. to 40° F. to form an emulsion while introducing air or an inert gas therein in an amount up to 50 percent by volume, said emulsion having protein material throughout, including its outer surfaces, said emulsion containing from 65 percent to 85 percent by weight water based on the total weight of the emulsion, and said emulsion having the fat portion of the uncooked meat reduced in particle size until it is less than 1/16-inch and substantially having the fat portion of the uncooked meat thoroughly smeared over the remaining portion of the meat;

(B) lowering the temperature of the emulsion by rapidly cooling the emulsion to a temperature of from −10° F. to 0° F. whereby the emulsion is in a frozen or semi-frozen state;

(C) tempering the frozen or semi-frozen emulsion to a temperature of from 28° F. to 35° F. for a time period of from about 1 hour to about 24 hours;

(D) dicing the tempered, frozen or semi-frozen emulsion;

(E) covering the diced, tempered, frozen or semi-frozen emulsion with an edible liquid having a temperature of at least 190° F. to heat set the protein material in the outer surfaces of the dice emulsion to form a skin around the emulsion dices and thereby prevent disintegration and agglomeration of said emulsion dices; and (F) cooking the diced emulsion and edible liquid after the protein material in the outer surface has been heat set by the edible liquid.

References Cited

UNITED STATES PATENTS

| | | | |
|---|---|---|---|
| 2,917,388 | 12/1959 | Sullivan et al. | 99—107 |
| 2,940,862 | 6/1960 | Forsythe | 99—187 |
| 3,574,633 | 4/1971 | Flier | 99—2 |

HYMAN LORD, Primary Examiner

U.S. Cl. X.R.

99—2, 108, 109, 187, 194